(12) United States Patent
Wu et al.

(10) Patent No.: US 12,487,372 B2
(45) Date of Patent: Dec. 2, 2025

(54) SEISMIC QUANTITATIVE PREDICTION METHOD FOR SHALE TOC BASED ON SENSITIVE PARAMETER VOLUMES

(71) Applicant: Chengdu University of Technology, Chengdu (CN)

(72) Inventors: Chaorong Wu, Chengdu (CN); Cheng Liu, Chengdu (CN); Kaixing Huang, Chengdu (CN); Yong Li, Chengdu (CN); Yizhen Li, Chengdu (CN); Junxiang Li, Chengdu (CN); Yuexiang Hao, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 247 days.

(21) Appl. No.: 18/341,781

(22) Filed: Jun. 27, 2023

(65) Prior Publication Data
US 2024/0094419 A1 Mar. 21, 2024

(30) Foreign Application Priority Data
Sep. 19, 2022 (CN) .......................... 202211135531.2

(51) Int. Cl.
 *G01V 1/30* (2006.01)
(52) U.S. Cl.
 CPC ........ *G01V 1/30* (2013.01); *G01V 2210/6169* (2013.01)
(58) Field of Classification Search
 None
 See application file for complete search history.

(56) References Cited

U.S. PATENT DOCUMENTS

2017/0241921 A1*  8/2017  Chen ...................... E21B 49/00

FOREIGN PATENT DOCUMENTS

CN    107870368 A  *  4/2018  .............. G01V 1/40

OTHER PUBLICATIONS

English machine translation of Huo et al. (CN 107870368 A) (Year: 2017).*

* cited by examiner

*Primary Examiner* — Walter L Lindsay, Jr.
*Assistant Examiner* — Geoffrey T Evans

(57) ABSTRACT

A seismic quantitative prediction method for shale total organic carbon (TOC) based on sensitive parameter volumes is as follows. A target stratum for a TOC content to be measured is determined, logging curves with high correlations with TOC contents are analyzed, the logging curves are found as sensitive parameters; sample data are constructed using the sensitive parameters; a radial basis function (RBF) neural network is trained with the sample data as an input and the TOC content at a depth corresponding to the sample data as an output to obtain a RBF neural network prediction model; sensitive parameter volumes are obtained by using the sensitive parameters and post stack three-dimension seismic data to invert; prediction samples are constructed using the sensitive parameter volumes; the predicted samples are input to the RBF neural network prediction model to calculate corresponding TOC values, thereby the TOC content of the target stratum is predicted.

6 Claims, 8 Drawing Sheets

SEISMIC QUANTITATIVE PREDICTION METHOD FOR SHALE TOC BASED ON SENSITIVE PARAMETER VOLUMES

TECHNICAL FIELD

The disclosure relates to a seismic prediction method, in particular to a seismic quantitative prediction method for shale total organic carbon (TOC) based on sensitive parameter volumes.

BACKGROUND

In recent years, due to a rapid development of unconventional oil and gas exploration and development, a shale reservoir evaluation has received a widespread attention worldwide. A total organic carbon (TOC) is a key indicator to evaluate an organic matter abundance and a hydrocarbon generation capacity of a source rock, and its content has multiple impacts on a shale gas reservoir. The TOC content has a great impact on porosity, wettability, permeability and microstructure of a shale reservoir. In addition, an organic carbon content is an important factor affecting matrix porosity and controlling an adsorption gas of the shale gas reservoir. As a component of a rock matrix, the organic carbon content strongly affects a geological and mechanical property of a shale. Therefore, an accurate and reliable shale TOC prediction method plays a very important role in the exploration and development of unconventional oil and gas reservoirs.

At present, many logging prediction methods are based on a quantitative relationship between a resistivity, the porosity, and the TOC content, which achieve a high-accuracy TOC content prediction. However, a seismic quantitative prediction for the TOC is difficult to apply the logging prediction methods, as the seismic quantitative prediction is difficult to establish a close correlation between seismic data and the TOC content, similar to logging parameters such as the resistivity and the porosity. At present, seismic parameters that are used as predictions include seismic attributes such as an amplitude, an instantaneous attribute and a frequency, and pre-stack inversion parameters related to an elasticity such as density, wave impedance, xp, pp etc. However, a response mechanism between most of the seismic attributes and the TOC content is unclear, and a correlation mechanism needs to be further researched between the different seismic attributes and organic carbon characteristics to ensure a rationality of results. Meanwhile, it is uneasy to obtain pre-stack elastic parameters, which need to be obtained through the pre-stack inversion, rock physics, and other methods. In complex geological conditions, a use of only a few of the pre-stack elastic parameters for the seismic prediction of the TOC content is limited by data conditions and does not have a universality.

SUMMARY

A purpose of the disclosure is to provide a seismic quantitative prediction method for shale total organic carbon (TOC) based on sensitive parameter volumes, which solves above problem by utilizing multiple parameters for a TOC content prediction, with a fast prediction speed and a high-accuracy.

In order to achieve the purpose, a technical solution adopted by the disclosure is a seismic quantitative prediction method for shale TOC based on sensitive parameter volumes, including the following steps:

step (1) determining a target stratum for a TOC content to be measured in a stratum; obtaining logging data of the target stratum and post stack three-dimensional (3D) seismic data; determining M numbers of depths at equal intervals on the target stratum and obtaining a TOC content of a core at each of the M numbers of depths; where the logging data include a plurality of logging curves;

step (2) performing a correlation analysis on each of the plurality of logging curves and the TOC contents at the M numbers of depths to obtain a correlation coefficient between each logging curve and the TOC contents; setting a threshold and retaining the logging curves with the correlation coefficient greater than the threshold as sensitive parameters; where the number of the sensitive parameters is N, and the sensitive parameters are labeled as first to Nth sensitive parameters;

step (3) constructing sample data:
constructing the sample data at each depth of the target stratum, where the sample data at a jth depth of the M numbers of depths is $L_j$, $L_j=\{L1j, L2j, \ldots, Lij, \ldots, LNj\}$, and the $L_{ij}$ represents a value of the ith sensitive parameter at the jth depth, $i=1\sim N$, and $j=1\sim M$;

step (4) establishing a radial basis function (RBF) neural network, and training the RBF neural network with the sample data as an input and the TOC content at the depth corresponding to the sample data as an output to obtain a RBF neural network prediction model;

step (5) for the first to Nth sensitive parameters, using each sensitive parameter as a constraint, obtaining sensitive parameter volumes by performing inversion based on the post stack 3D seismic data; where the sensitive parameter volumes are labeled as first to Nth sensitive parameter volumes;

step (6) constructing prediction samples, including steps (61)~(65);

step (61) forming a three-dimensional data volume of P×Q×H for each sensitive parameter volume, where each sensitive parameter volume has a same size, and a line number, a trace number, and a sampling point of each sensitive parameter volume are P, Q, and H, respectively;

step (62) organizing the first sensitive parameter volume into a two-dimensional matrix of K×H, and converting the two-dimensional matrix into a one-dimensional array of 1×L, K=P×Q, and L=K×H;

step (63) processing the second to the Nth sensitive parameter volumes into one-dimensional arrays respectively; where in the one-dimensional arrays, elements at same positions correspond to same coordinate values;

step (64) taking one-dimensional vectors (i.e. the one-dimensional arrays) corresponding to the first to the Nth data volumes (i.e. sensitive parameter volumes) as data from first to Nth rows of a matrix, respectively, to form a prediction matrix of N×L; and step (65) extracting each column of the data from the prediction matrix to form a prediction sample, where the number of the prediction sample is L;

step (7) inputting the L numbers of prediction samples into the RBF neural network prediction model, outputting L numbers of TOC values, and for each TOC value, using coordinates of the prediction sample corresponding to the TOC value as coordinates of the TOC value to obtain a TOC value with coordinates, thereby obtaining a one-dimensional TOC array; where the coordinates include a line number, a trace number, and a sampling point; and step (8) transforming the one-dimensional TOC array to form a three-dimensional TOC data volume of P×Q×H according to the coordinates, thereby predicting a TOC content of the target stratum.

In an embodiment, the logging curves include a density curve, an interval transit time curve, a porosity curve, a resistivity curve, a potassium content curve and a uranium content curve, and the TOC content of the core at each depth is obtained by a geochemical analysis of a TOC content of a shale core.

In an embodiment, the correlation analysis in step (2) specifically includes using a statistical product and service solutions (SPSS) statistical analysis software for the correlation analysis.

The sensitive parameters and the sensitive parameter volumes are as follows.

In March 2019, an article titled "Seismic Quantitative Prediction Method and Application of the TOC Content in Shale from Wufeng Formation to Longmaxi Formation in Weiyuan Area, Sichuan Basin" in "Natural Gas Geoscience" mentioned a TOC sensitive parameter and how to combine the TOC sensitive parameter with seismic data to obtain a 3D sensitive parameter volume.

In the disclosure, the RBF neural network includes an input layer, a hidden layer, and an output layer, which has significant advantages in an optimal fitting performance and a global fitting. The RBF neural network is very suitable for fitting nonlinear data. The RBF neural network trains complex nonlinear relationship network models between the TOC and multiple other parameters. The RBF neural network improves a prediction accuracy of the TOC, and achieves the seismic quantitative prediction of the shale TOC.

When using the post stack 3D seismic data to invert the sensitive parameter volumes with each sensitive parameter as a constraint, it is necessary to use the logging data and the seismic data. However, the logging data is in a depth domain, while the seismic data is in a time domain, it is necessary to convert through synthetic records to find a correct time depth relationship, ensure that the logging data and the seismic data correspond to each other at the same depth, and ensure that inversion results are accurate without a significant deviation. A seismic phase-control inversion used in the disclosure establishes a mapping relationship between a seismic waveform structure and a logging curve structure through a dynamic clustering analysis of the seismic waveform, achieving a high-resolution seismic waveform indication simulation of natural gamma and the other non-wave impedance curves, thereby obtaining the sensitive parameter volume required for the prediction.

For the multiple sensitive parameter volumes, each sensitive parameter volume is divided in an order of a volume, a surface, and a line, and ultimately each 3D data volume is divided into the one-dimensional array. Each element in the one-dimensional array corresponds to the line number, the trace number, and the sampling point before dividing. The one-dimensional arrays are used to construct prediction samples for the prediction, then a one-dimensional array about TOC contents are obtained, and then the 3D data volume is reconstructed in the order of the line, the surface, and the volume.

Compared with the related art, advantages of the disclosure are as follows.

(1) The disclosure overcomes a limitation of using only a few elastic parameters and seismic attributes for a seismic prediction of the TOC content and lacking a universality in the related art. The more sensitive parameter volumes are obtained by using the multiple parameters with a high correlation with the TOC content for prediction. Thus, compared with the related art, the disclosure uses the more parameters with a high correlation with the TOC content to achieve a high-accuracy prediction of the shale TOC content, with a wider application range and an easier prediction.

(2) The disclosure achieves a nonlinear fitting between input sensitive parameters and output TOC contents by using the neural network, which has the higher prediction accuracy compared to traditional modeling methods.

DETAILED DESCRIPTION OF EMBODIMENTS

Figure 1:
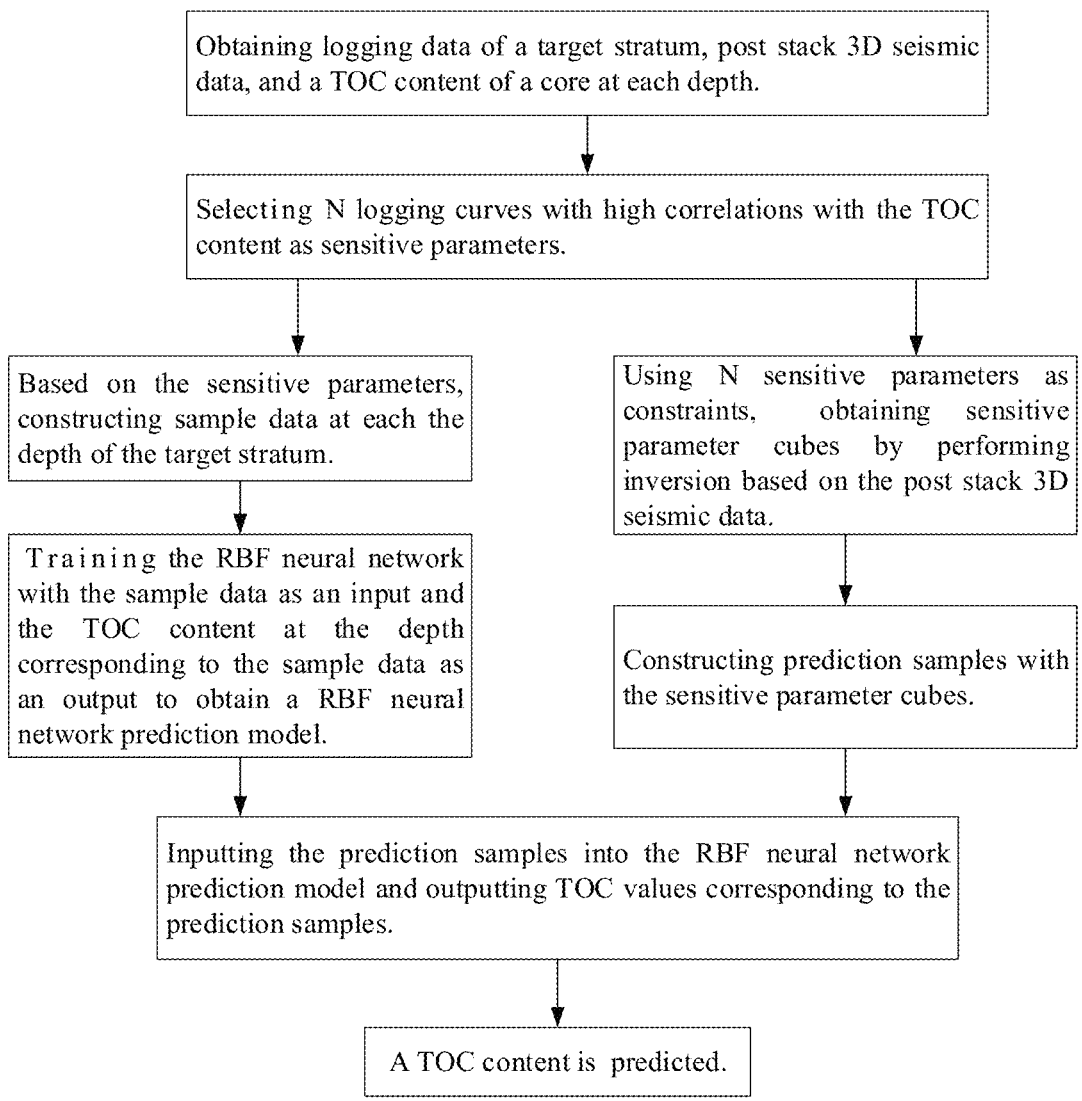
FIG. 1 is a flowchart of the disclosure.
Figure 2:
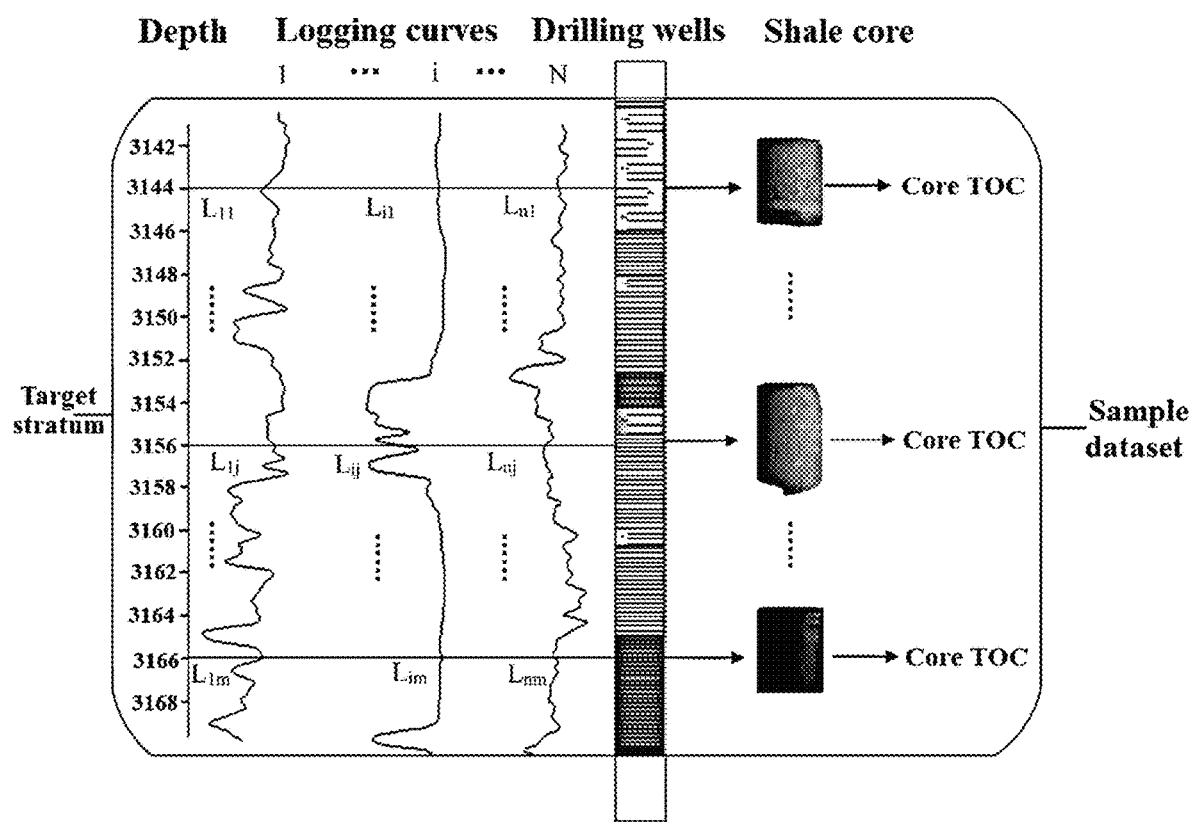
FIG. 2 is a schematic diagram of the composition of sample data at the target stratum
Figure 3A:
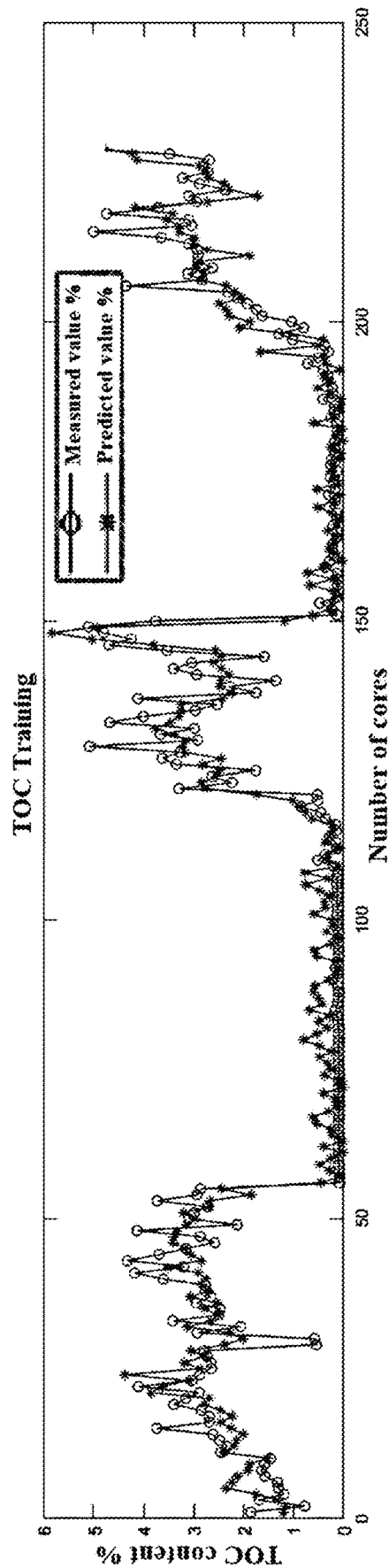
FIG. 3A is a schematic diagram of a comparison between measured TOC values and predicted TOC values of training data.
Figure 3B:
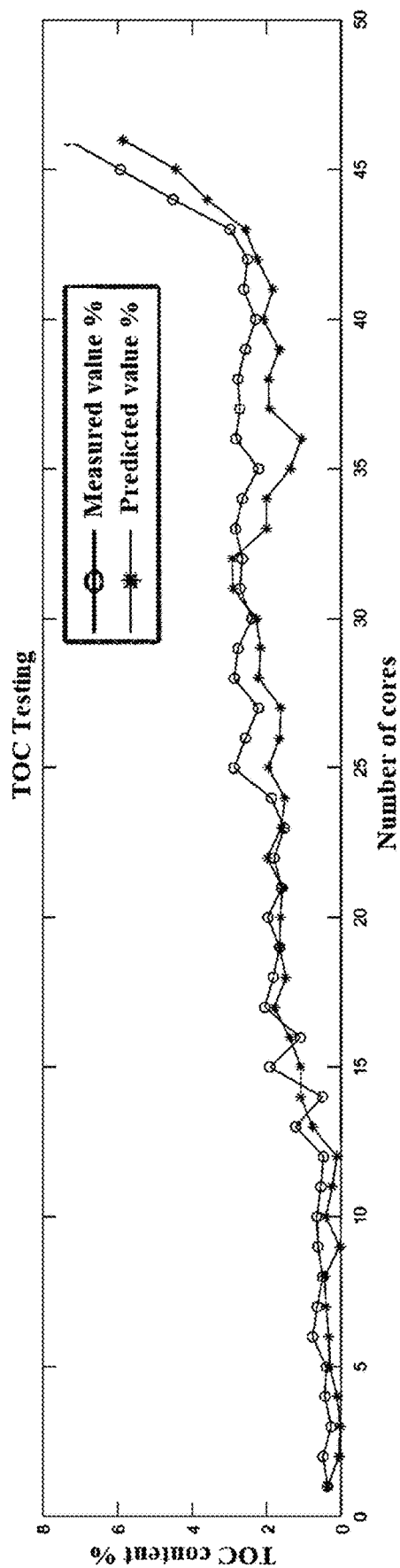
FIG. 3B is a schematic diagram of the comparison between measured TOC values and predicted TOC values of testing data.

The disclosure is further explained in conjunction with accompanying drawings.

Embodiment 1

Referring to FIGS. 1~5, a seismic quantitative prediction method for shale total organic carbon (TOC) based on sensitive parameter volumes includes following steps:

step (1) determining a target stratum for a TOC content to be measured in a stratum; obtaining logging data of the target stratum and post stack three-dimensional (3D) seismic data; determining M numbers of depths at equal intervals on the target stratum and obtaining a TOC content of a core at each of the M numbers of depths; where the logging data include a plurality of logging curves;

step (2) performing a correlation analysis on each of the plurality of logging curves and the TOC contents at the M numbers of depths to obtain a correlation coefficient between each logging curve and the TOC contents; setting a threshold and retaining the logging curves with the correlation coefficient greater than the threshold as sensitive parameters; where the number of the sensitive parameters is N, and the sensitive parameters are labeled as first to Nth sensitive parameters;

step (3) constructing sample data:

constructing the sample data at each depth of the target stratum, where the sample data at a jth depth of the M numbers of depths is $L_j$, $L_j = \{L_{1j}, L_{2j}, \ldots, L_{ij}, \ldots, L_{Nj}\}$, and the $L_{ij}$ represents a value of the ith sensitive parameter at the jth depth, i=1~N, and j=1~M;

step (4) establishing a radial basis function (RBF) neural network, and training the RBF neural network with the sample data as an input and the TOC content at the depth corresponding to the sample data as an output to obtain a RBF neural network prediction model;

step (5) for the first to Nth sensitive parameters, using each sensitive parameter as a constraint, obtaining sensitive parameter volumes by performing inversion based on the post stack 3D seismic data; where the sensitive parameter volumes are labeled as first to Nth sensitive parameter volumes;

step (6) constructing prediction samples, including steps (61)~(65);

step (61) forming a three-dimensional data volume of P×Q×H for each sensitive parameter volume, where each sensitive parameter volume has a same size, and a line number, a trace number, and a sampling point of each sensitive parameter volume are P, Q, and H, respectively;

step (62) organizing the first sensitive parameter volume into a two-dimensional matrix of K×H, and converting the two-dimensional matrix into a one-dimensional array of 1×L, K=P×Q, and L=K×H;

step (63) processing the second to the Nth sensitive parameter volumes into one-dimensional arrays respectively; where in the one-dimensional arrays, elements at same positions correspond to same coordinate values;

step (64) taking the one-dimensional arrays corresponding to the first to the Nth data volumes (i.e. sensitive parameter volumes) as data from first to Nth rows of a matrix, respectively, to form a prediction matrix of N×L; and step (65) extracting each column of the data from the prediction matrix to form a prediction sample, where the number of the prediction sample is L;

step (7) inputting the L numbers of prediction samples into the RBF neural network prediction model, outputting L numbers of TOC values, and for each TOC value, using coordinates of the prediction sample corresponding to the TOC value as coordinates of the TOC value to obtain a TOC value with coordinates, thereby obtaining a one-dimensional TOC array; where the coordinates include a line number, a trace number, and a sampling point; and step (8) transforming the one-dimensional TOC array to form a three-dimensional TOC data volume of P×Q×H according to the coordinates, thereby predicting a TOC content of the target stratum.

In an embodiment, the logging curves include a density curve, an interval transit time curve, a porosity curve, a resistivity curve, a potassium content curve and a uranium content curve, and the TOC content of the core at each depth is obtained by a geochemical analysis of a TOC content of a shale core.

In an embodiment, the correlation analysis in step (2) includes using a statistical product and service solutions (SPSS) statistical analysis software for the correlation analysis.

In step (1), assuming that the target stratum is located at a depth of 2200~2300 underground, a total thickness of the target stratum is 100 meters (m). Samples are taken at equal intervals of 1 m, resulting in the 100 sampling points at the depth.

In step (2), based on experience, the threshold is set to 0.4 or 0.5 above. There are dozens to hundreds of the logging curves in the logging data, the correlation analysis performed between each logging curve and the TOC content requires a significant amount of work. To simplify a calculation, a batch of the logging curves related to the TOC content based on the experience are selected, and then the correlation analysis is performed between the preliminarily selected logging curves and the TOC content, and the logging curves with correlation coefficients greater than the threshold are retained as the sensitive parameters. Assuming that in the embodiment, the following logging curves with the high correlation with the TOC content are analyzed, including: the density curve, in grams per cubic centimeter ($g/cm^3$); the interval transit time curve, in micro second per foot (μs/ft); the resistivity curve, in ohm meter (Ω·m); the porosity curve, in %; the potassium content curve, in %; the uranium element content curve, and in microgram per gram (μg/g). The correlation coefficients are 0.871, 0.709, 0.491, 0.637, 0.758, and 0.707, respectively. Then the N=6, the above 6 logging curves are labeled as the first to 6th logging curves respectively;

In step (3), the sample data at the first depth is $L_1$, $L_1 = \{L_{11}, L_{21}, L_{31}, L_{41}, L_{51}, L_{61}\}$; the $L_{11}$~$L_{61}$ represent the values of the density curve, the interval transit time curve, the resistivity curve, the porosity curve, the potassium content curve, and the uranium content curve at the depth, respectively. The sample data at other depths can be obtained similarly.

In step (4), a structure of the RBF neural network is a three-layer feedforward neural network with a single hidden layer, which is a local approximation network, the structure of the RBF neural network includes three layers: an input layer, a hidden layer, and an output layer. The input layer is a bridge connecting an external environment and the RBF neural network. The hidden layer usually has a high dimension and has a function of mapping vectors from the low dimensions to the high dimensions, which can make nonlinear data that is linearly separable in the low dimensions become linearly separable in the high dimensions. The third layer is the output layer, which is a linear mapping from the hidden layer space to the output layer space.

In order to obtain the more sample data, five drilling wells in a shale exploration area, are selected, and data from the five drilling wells are collected to construct the sample data, and then, all the sample data are combined to form a dataset. Then, the sample data in the dataset are divided into training data and testing data. In practice, the data from the four drilling wells are used as the training data, accounting for 80%, to create a neural network model, while the data from the another drilling well is used as the testing data, accounting for 20%, to verify a reliability of the neural network model. During the training, the sample data are used as an input, and the TOC content at the corresponding depth is used as an output. The optimal neural network model is obtained by adjusting a number of neurons and spread constants of the neural network, which serves as the RBF neural network prediction model to be used in a next step.

The spread constants can be determined based on dispersion of data center, and the farther the input of the neurons is from the center of the RBF, the lower the activation level of the neurons.

When obtaining one of the training data and the testing data, a measured TOC content of the core is used as a measured TOC value, and then a corresponding TOC content output from the prediction model is used as a TOC predicted value. The measured TOC value of the training data is compared with the predicted TOC value obtained from the prediction model to obtain FIG. 3A, and the measured TOC value of the testing data is compared with the predicted TOC value obtained from the prediction model to obtain FIG. 3B. From the results in the FIG. 3A and FIG. 3B, it can be seen that the predicted TOC values are very close to the measured TOC values, with a high prediction accuracy. Prediction results of a testing drilling well indicate that the model is stable and reliable, with a strong and stable prediction ability.

Figure 4:
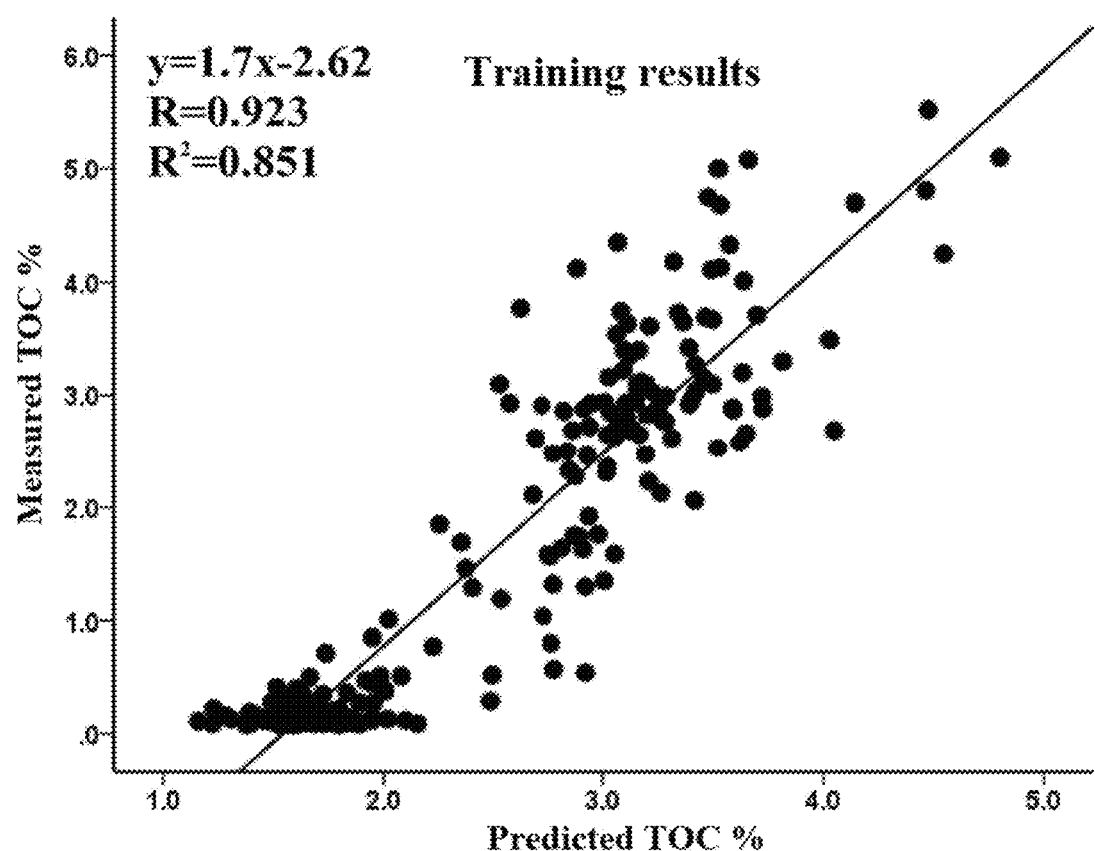
FIG. 4 is a schematic diagram of an intersection analysis of the measured TOC values and the predicted TOC values of the training data.

An intersection analysis is conducted between the measured TOC values of the training data and the predicted TOC values, and then FIG. 4 is obtained. In FIG. 4, the correlation between the measured TOC values of the training data and the predicted TOC values reached 0.923.

Figure 5:
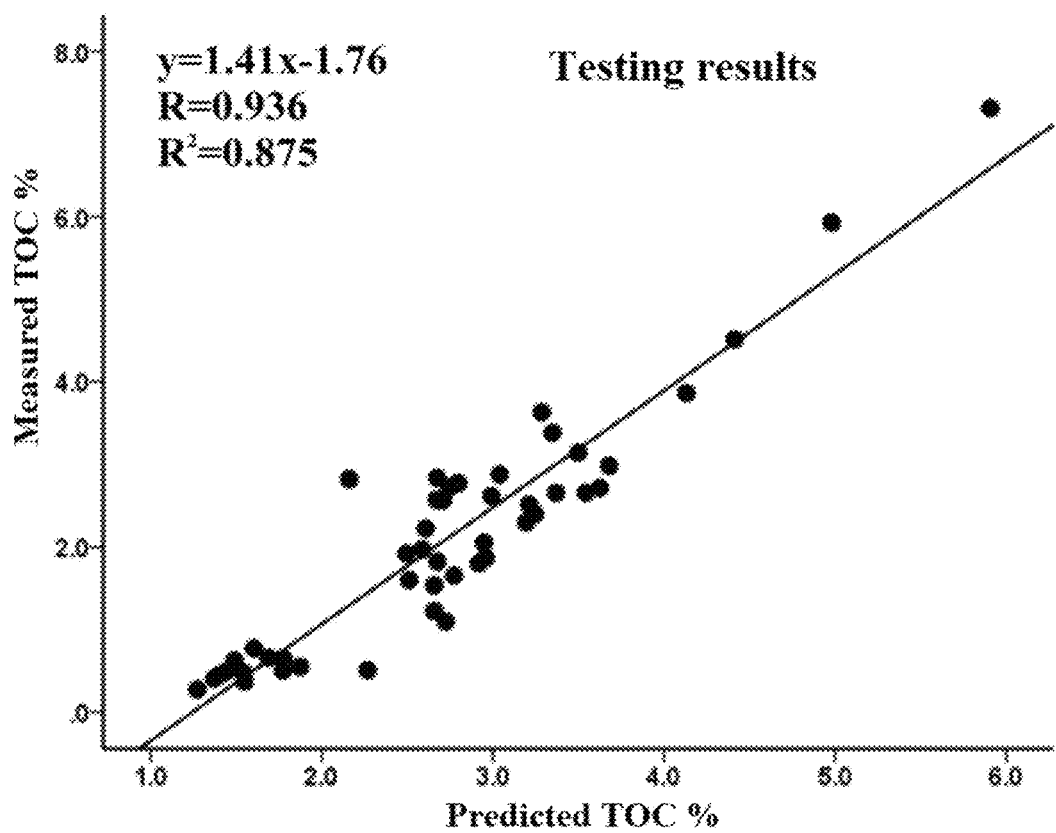
FIG. 5 is a schematic diagram of an intersection analysis of the measured TOC values and the predicted TOC values of the testing data.

Similarly, an intersection analysis is conducted between the measured TOC values of the testing data and the predicted TOC values, and then FIG. 5 is obtained. In FIG. 5, the correlation between the measured TOC values of the testing data and the predicted TOC values reached 0.936.

Embodiment 2

Figure 6:
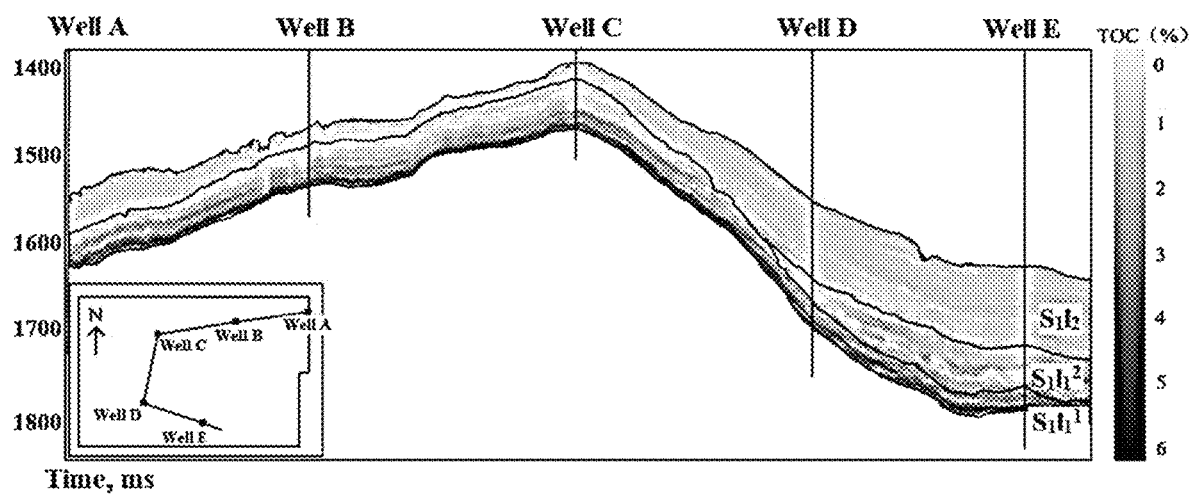
FIG. 6 is a schematic diagram of a well-connected profile map of the TOC content prediction in a research area of an embodiment 2 of the disclosure.
Figure 7:
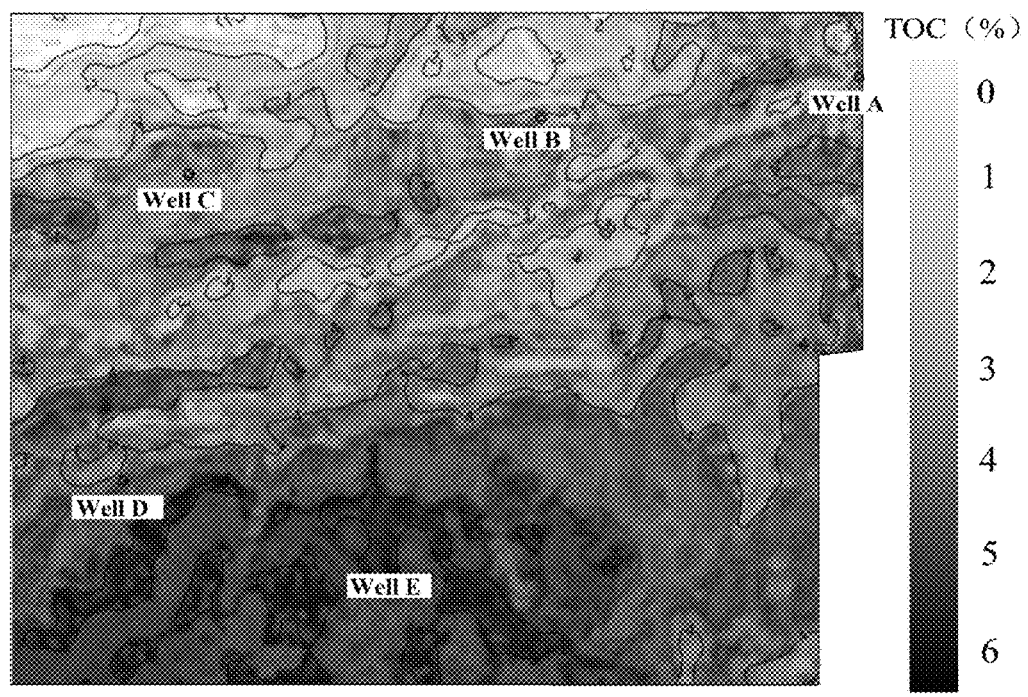
FIG. 7 is a schematic diagram of a plan view of an average TOC content of subsection 1 of Longmaxi Formation section 1 ($S_1l_1^{\ 1}$) predicted by the disclosure.
Figure 8:
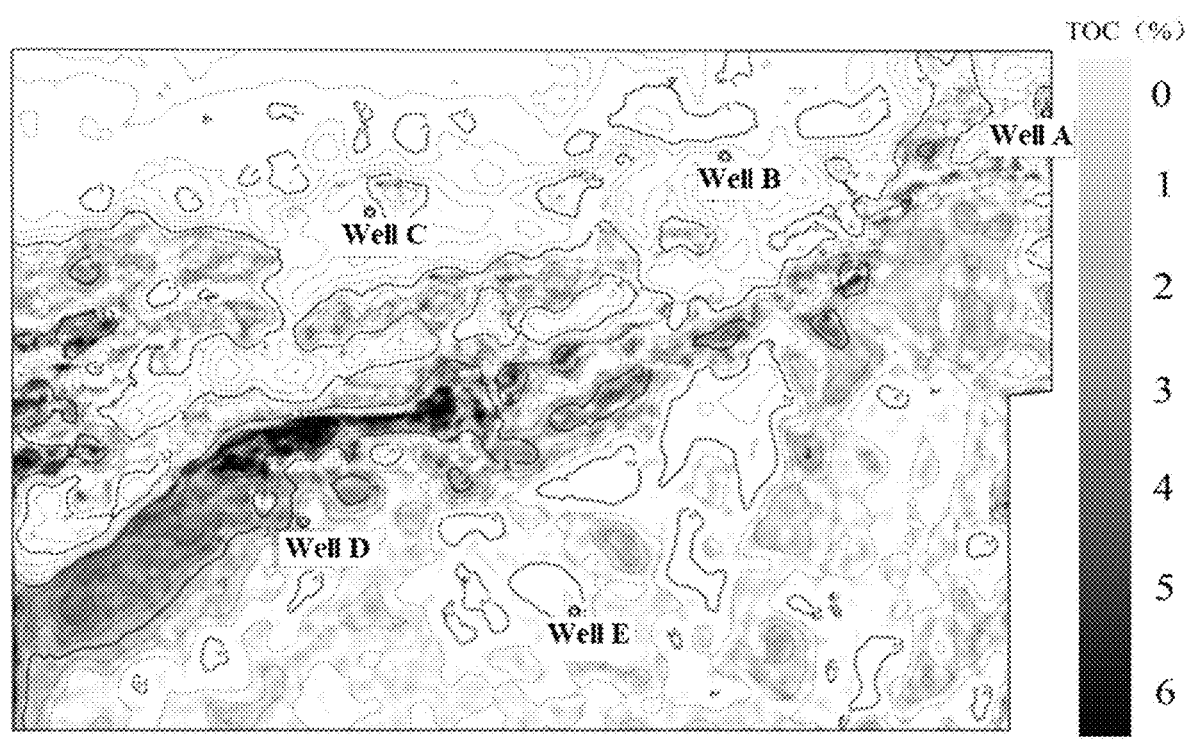
FIG. 8 is a schematic diagram of a plan view of an average TOC content of subsection 2 of the Longmaxi Formation section 1 ($S_1l_1^{\ 2}$) predicted by the disclosure.

Referring to FIGS. 6~8, a specific application of the disclosure is provided based on the embodiment 1. A shale gas block in southern Sichuan is selected as a research area. A Lower Silurian Longmaxi Formation shale is selected as a research target to predict the TOC content. The research mainly focuses on Longmaxi Formation Section 1 ($S_1l_1$) and Longmaxi Formation Section 2 ($S_1l_2$), with the $S_1l_1$ subdivided into subsection 1 of the $S_1l_1$ ($S_1l_1^1$) and subsection 2 of the $S_1l_1$ ($S_1l_1^2$).

A well-connected profile map of the TOC content prediction of the research area is shown in FIG. 6. The TOC content in the $S_1l_1^1$ is relatively high, mainly between 1% and 5%, showing a downward trend of high to upper low in a vertical direction. The TOC content at a bottom can reach 4% or more, while the TOC content decreases upwards, reaching 1% to 3%. In a horizontal direction, a heterogeneity of a distribution of the TOC is relatively small, and the overall TOC value is high. The distribution is also relatively stable, but there are local changes.

The TOC content of the $S_1l_1^2$ is relatively low, generally less than 2%, with only local areas having the TOC content greater than 2% at the bottom. The TOC content varies horizontally, fluctuating from high to low, presenting an unstable state.

The TOC content of the $S_1l_2$ is low, with almost most areas having the TOC content below 1%, and only the local areas having the TOC content above 1% and below 5%. There is a slight change in the TOC content horizontally.

FIG. 7 is a schematic diagram of a plane distribution of an average TOC content of the $S_1l_1^1$. FIG. 7 shows that the TOC content in the $S_1l_1^1$ is relatively high, with an overall trend being higher in southeast and relatively lower in northwest. The TOC content is distributed in a northeast trending strip, with an average value of up to 5%. The TOC content around wells B and E is relatively high, while the TOC content near wells A, C, and D is relatively low.

FIG. 8 is a schematic diagram of a plane distribution of an average TOC content of the $S_1l_1^2$, showing a low overall TOC content. The well-connected profile map of the TOC content prediction further indicates that the TOC content in most areas of the $S_1l_1^2$ is at a low value, resulting in a lower average TOC content in the $S_1l_1^2$.

From the plane view of the TOC content prediction, it can be seen that the high TOC areas in the $S_1l_1^2$ are mainly distributed in northeast and southwest, with an average value of approximately in a range of 2%~3%, and almost all other areas are below 2%.

Through above analyses, it is believed that the TOC distribution of the $S_1l_1^1$ in the southeast of the research area has the low heterogeneity, the high average content and a wide distribution range, which is a favorable area for shale gas exploration and development in the research area.

The above embodiments are only preferred embodiments of the disclosure and are not intended to limit the disclosure. Any modifications, equivalent substitutions, and improvements made within spirits and principles of the disclosure shall be included in a scope of a protection of the disclosure.

What is claimed is:

1. A seismic quantitative prediction method for shale total organic carbon (TOC) based on sensitive parameter volumes, wherein the seismic quantitative prediction method comprises:

step (1) determining a target stratum for a TOC content to be measured in a stratum; obtaining logging data of the target stratum and post stack three-dimensional (3D) seismic data; determining M numbers of depths at equal intervals on the target stratum and obtaining a TOC content of a core at each of the M numbers of depths; wherein the logging data comprise a plurality of logging curves;

step (2) performing a correlation analysis on each of the plurality of logging curves and the TOC contents at the M numbers of depths to obtain a correlation coefficient between each logging curve and the TOC contents; setting a threshold and retaining the logging curves with the correlation coefficient greater than the threshold as sensitive parameters; and the number of the sensitive parameters being N, and the sensitive parameters being labeled as first to Nth sensitive parameters;

step (3) constructing sample data:
constructing the sample data at each depth of the target stratum, wherein the sample data at a jth depth of the M numbers of depths is $L_j$, $L_j = \{L_{1j}, L_{2j}, \ldots, L_{ij}, \ldots, L_{Nj}\}$, where $L_{ij}$ represents a value of the ith sensitive parameter at the jth depth, i=1~N, and j=1~M;

step (4) establishing a radial basis function (RBF) neural network, and training the RBF neural network with the sample data as an input and the TOC content at the depth corresponding to the sample data as an output to obtain a RBF neural network prediction model;

step (5) for the first to Nth sensitive parameters, using each sensitive parameter as a constraint, obtaining sensitive parameter volumes by performing inversion based on the post stack 3D seismic data; and the sensitive parameter volumes being labeled as first to Nth sensitive parameter volumes;

step (6) constructing prediction samples, comprising steps (61)~(65);

step (61) forming a three-dimensional data volume of P×Q×H for each sensitive parameter volume, each sensitive parameter volume having a same size, and a line number, a trace number, and a sampling point of each sensitive parameter volume being P, Q, and H, respectively;

step (62) organizing the first sensitive parameter volume into a two-dimensional matrix of K×H, and converting the two-dimensional matrix into a one-dimensional array of 1×L wherein K=P×Q, and L=K×H;

step (63), processing the second to the Nth sensitive parameter volumes into one-dimensional arrays respectively; and in the one-dimensional arrays, elements at same positions correspond to same coordinate values;

step (64) taking the one-dimensional arrays corresponding to the first to the Nth sensitive parameter volumes as data from first to Nth rows of a matrix, respectively, to form a prediction matrix of N×L; and step (65) extracting each column of the data from the prediction matrix to form a prediction sample, and the number of the prediction sample being L;

step (7) inputting the L numbers of prediction samples into the RBF neural network prediction model, outputting L numbers of TOC values, and for each TOC value, using coordinates of the prediction sample corresponding to the TOC value as coordinates of the TOC value to obtain a TOC value with coordinates, thereby obtaining a one-dimensional TOC array; the coordinates comprising a line number, a trace number, and a sampling point;

step (8) transforming the one-dimensional TOC array to form a three-dimensional TOC data volume of P×Q×H according to the coordinates, thereby predicting a TOC content of the target stratum; and step (9) performing, based on the TOC content of the target stratum, shale gas exploration and development on the target stratum.

2. The seismic quantitative prediction method for the shale TOC based on the sensitive parameter volumes as claimed in claim 1, wherein the logging curves comprise a density curve, an interval transit time curve, a porosity curve, a resistivity curve, a potassium content curve and a uranium content curve, and the TOC content of the core at each depth is obtained by a geochemical analysis of a TOC content of a shale core.

3. The seismic quantitative prediction method for the shale TOC based on the sensitive parameter volumes as claimed in claim 1, wherein the correlation analysis in step (2) comprises using a statistical product and service solutions (SPSS) statistical analysis software for the correlation analysis.

4. The seismic quantitative prediction method for the shale TOC based on the sensitive parameter volumes as claimed in claim 1, wherein the performing, based on the TOC content of the target stratum, oil and gas exploration of the target stratum comprises:

in response to the TOC content of the target stratum being greater than 2%, exploring shale gas in the target stratum.

5. The seismic quantitative prediction method for the shale TOC based on the sensitive parameter volumes as claimed in claim 1, wherein the TOC content of the target stratum is used to guide exploration and development of unconventional oil and gas reservoirs of the target stratum.

6. A seismic quantitative prediction method for shale total organic carbon (TOC) based on sensitive parameter volumes, wherein the seismic quantitative prediction method comprises:

step (1) determining a target stratum for a TOC content to be measured in a stratum; obtaining logging data of the target stratum and post stack three-dimensional (3D) seismic data; determining M numbers of depths at equal intervals on the target stratum and obtaining a TOC content of a core at each of the M numbers of depths; wherein the logging data comprise a plurality of logging curves, where the target stratum comprises multiple sub-stratums;

step (2) performing a correlation analysis on each of the plurality of logging curves and the TOC contents at the M numbers of depths to obtain a correlation coefficient between each logging curve and the TOC contents; setting a threshold and retaining the logging curves with the correlation coefficient greater than the threshold as sensitive parameters; and the number of the sensitive parameters being N, and the sensitive parameters being labeled as first to Nth sensitive parameters;

step (3) constructing sample data:

constructing the sample data at each depth of the target stratum, wherein the sample data at a jth depth of the M numbers of depths is $L_j$, $L_j = \{L_{1j}, L_{2j}, \ldots, L_{ij}, \ldots, L_{Nj}\}$, where $L_{ij}$ represents a value of the ith sensitive parameter at the jth depth, i=1~N, and j=1~M;

step (4) establishing a radial basis function (RBF) neural network, and training the RBF neural network with the sample data as an input and the TOC content at the depth corresponding to the sample data as an output to obtain an RBF neural network prediction model;

step (5) for the first to Nth sensitive parameters, using each sensitive parameter as a constraint, obtaining sensitive parameter volumes by performing inversion based on the post stack 3D seismic data; and the sensitive parameter volumes being labeled as first to Nth sensitive parameter volumes;

step (6) constructing prediction samples, comprising steps (61)~(65);

step (61) forming a three-dimensional data volume of P×Q×H for each sensitive parameter volume, each sensitive parameter volume having a same size, and a line number, a trace number, and a sampling point of each sensitive parameter volume being P, Q, and H, respectively;

step (62) organizing the first sensitive parameter volume into a two-dimensional matrix of K×H, and converting the two-dimensional matrix into a one-dimensional array of 1×L wherein K=P×Q, and L=K×H;

step (63), processing the second to the Nth sensitive parameter volumes into one-dimensional arrays respectively; and in the one-dimensional arrays, elements at same positions correspond to same coordinate values;

step (64) taking the one-dimensional arrays corresponding to the first to the Nth sensitive parameter volumes as data from first to Nth rows of a matrix, respectively, to form a prediction matrix of N×L; and step (65) extracting each column of the data from the prediction matrix to form a prediction sample, and the number of the prediction sample being L;

step (7) inputting the L numbers of prediction samples into the RBF neural network prediction model, outputting L numbers of TOC values, and for each TOC value, using coordinates of the prediction sample corresponding to the TOC value as coordinates of the TOC value to obtain a TOC value with coordinates, thereby obtaining a one-dimensional TOC array; the coordinates comprising a line number, a trace number, and a sampling point;

step (8) transforming the one-dimensional TOC array to form a three-dimensional TOC data volume of P×Q×H according to the coordinates, thereby predicting a TOC content of each of the multiple sub-stratums of the target stratum, wherein the TOC content of each of the multiple sub-stratums of the target stratum is used to guide exploration and development of unconventional oil and gas reservoirs of a corresponding sub-stratum of the multiple sub-stratums; and step (9) selecting a target area with a maximum TOC content from the multiple sub-stratums of the target stratum, and performing shale gas exploration and development on the target area.

* * * * *